US012636988B2

(12) United States Patent
Kuwano et al.

(10) Patent No.: US 12,636,988 B2
(45) Date of Patent: May 26, 2026

(54) AUXILIARY STORAGE BOX

(71) Applicant: SUBARU CORPORATION, Tokyo (JP)

(72) Inventors: Tomoaki Kuwano, Tokyo (JP); Sakura Tsuji, Tokyo (JP); Yusuke Yazaki, Tokyo (JP); Ryunosuke Akechi, Tokyo (JP); Tomoya Yokoi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 400 days.

(21) Appl. No.: 18/372,798

(22) Filed: Sep. 26, 2023

(65) Prior Publication Data

US 2024/0116448 A1      Apr. 11, 2024

(30) Foreign Application Priority Data

Oct. 7, 2022      (JP) ................................. 2022-162800

(51) Int. Cl.
B60N 2/75          (2018.01)
B60R 7/04          (2006.01)
B60R 11/00          (2006.01)

(52) U.S. Cl.
CPC ................ B60N 2/793 (2018.02); B60R 7/04 (2013.01); *B60R 2011/0007* (2013.01)

(58) Field of Classification Search
CPC .................................. B60N 2/79; B60N 2/793
See application file for complete search history.

(56) References Cited

U.S. PATENT DOCUMENTS

| | | | | |
|---|---|---|---|---|
| 9,561,753 | B1 * | 2/2017 | Mendoza Vera | .......... B60R 7/04 |
| 11,285,848 | B2 * | 3/2022 | Morishita | ................ B60N 3/10 |
| 11,891,018 | B2 * | 2/2024 | Takagi | .................... E05B 77/06 |
| 12,286,819 | B2 * | 4/2025 | Kwon | ..................... E05B 77/36 |
| 2020/0247323 | A1 * | 8/2020 | Smolik | .................. B60N 2/793 |

FOREIGN PATENT DOCUMENTS

JP          7-266993 A      10/1995

* cited by examiner

*Primary Examiner* — Nicholas McFall

(74) *Attorney, Agent, or Firm* — TROUTMAN PEPPER LOCKE LLP

(57)          ABSTRACT

An auxiliary storage box is detachable and storable in a storage box provided in a vehicle interior. The auxiliary storage box includes: an auxiliary box body; and an auxiliary box attachment. The auxiliary box body is storable inside the storage box. The auxiliary box attachment is detachably attached to the auxiliary box body and capable of supporting an auxiliary item used in combination with the auxiliary box body outside the auxiliary box body.

12 Claims, 12 Drawing Sheets

FIG. 6

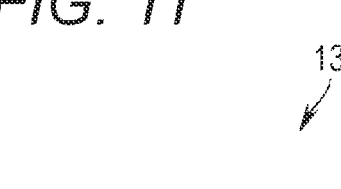
*FIG. 11*
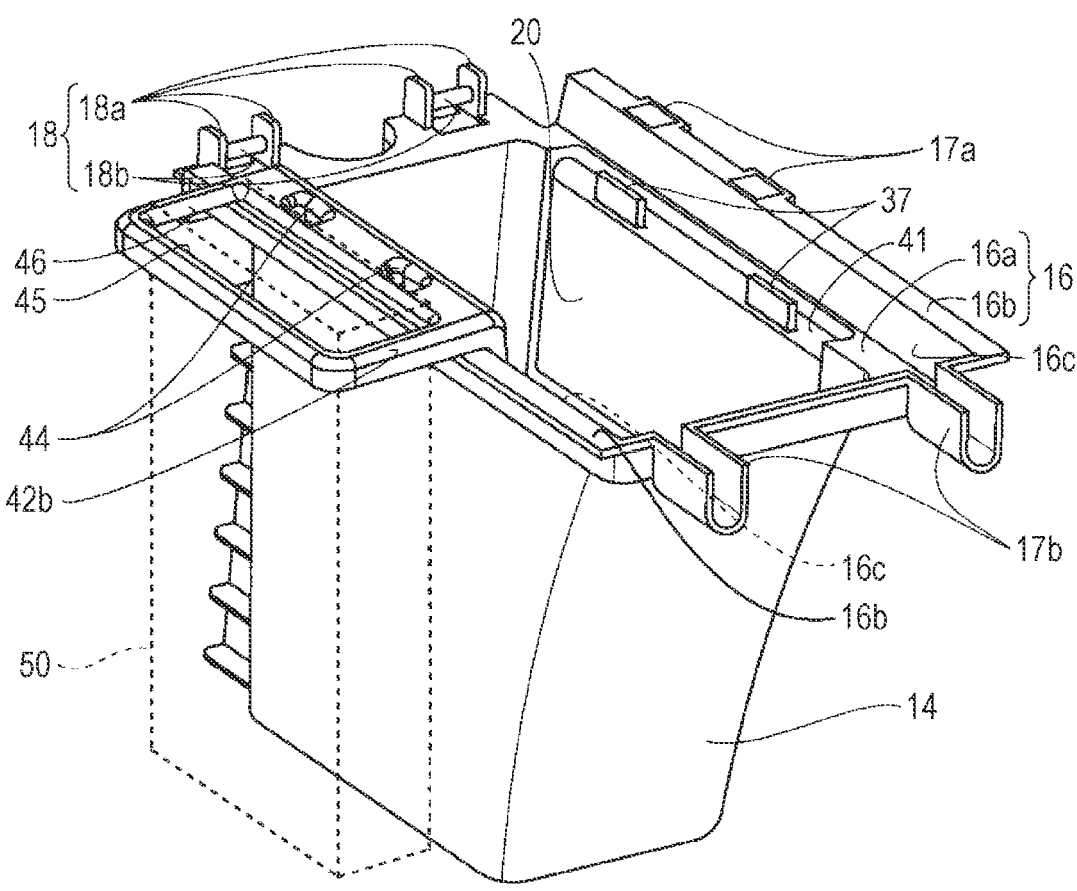

AUXILIARY STORAGE BOX

CROSS-REFERENCE TO RELATED APPLICATION

The present application claims priority from Japanese Patent Application No. 2022-162800 filed on Oct. 7, 2022, the entire contents of which are hereby incorporated by reference.

BACKGROUND

The disclosure relates to an auxiliary storage box of a storage box provided in a vehicle interior of a vehicle.

Conventionally, a storage box for storing an article is provided in a vehicle interior of a vehicle. In recent years, such a storage box is intended to cope with storage of various articles in order to improve convenience for a user.

For example, as is well known, in a center console, a dashboard, or the like, a large-capacity storage box such as a console box or a glove box is provided by using a wide space inside.

In order to further improve the convenience of such a large-capacity storage box, various techniques have been conventionally proposed. For example, Japanese Unexamined Patent Application Publication No. H07-266993 discloses a storage box (auxiliary storage box) that is detachably attached to the inside of a console box. The auxiliary storage box can be installed and used at an appropriate place in the vehicle. Further, the auxiliary storage box is provided with a rotary lid having a holder hole in an opening on an upper surface. The rotary lid having a holder hole is used as a lid for a garbage container or a lid for a small article container. Furthermore, a container containing a can, a bin, and food can be inserted into and held in the holder hole.

SUMMARY

An aspect of the disclosure provides an auxiliary storage box that is detachable and storable in a storage box provided in a vehicle interior. The auxiliary storage box includes an auxiliary box body and an auxiliary box attachment. The auxiliary box body is storable inside the storage box. The auxiliary box attachment is detachably attached to the auxiliary box body, and capable of supporting an auxiliary item used in combination with the auxiliary box body outside the auxiliary box body.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 6 is a perspective view of the auxiliary storage box in a state where the auxiliary lid body is opened with respect to the auxiliary box body in a state where the auxiliary lid body is attached to the auxiliary box body;

FIG. 11 is a perspective view of the auxiliary box body in a state where the auxiliary box attachment attached to an outside of the auxiliary box body as viewed from diagonally front right.

DETAILED DESCRIPTION

Figure 1:
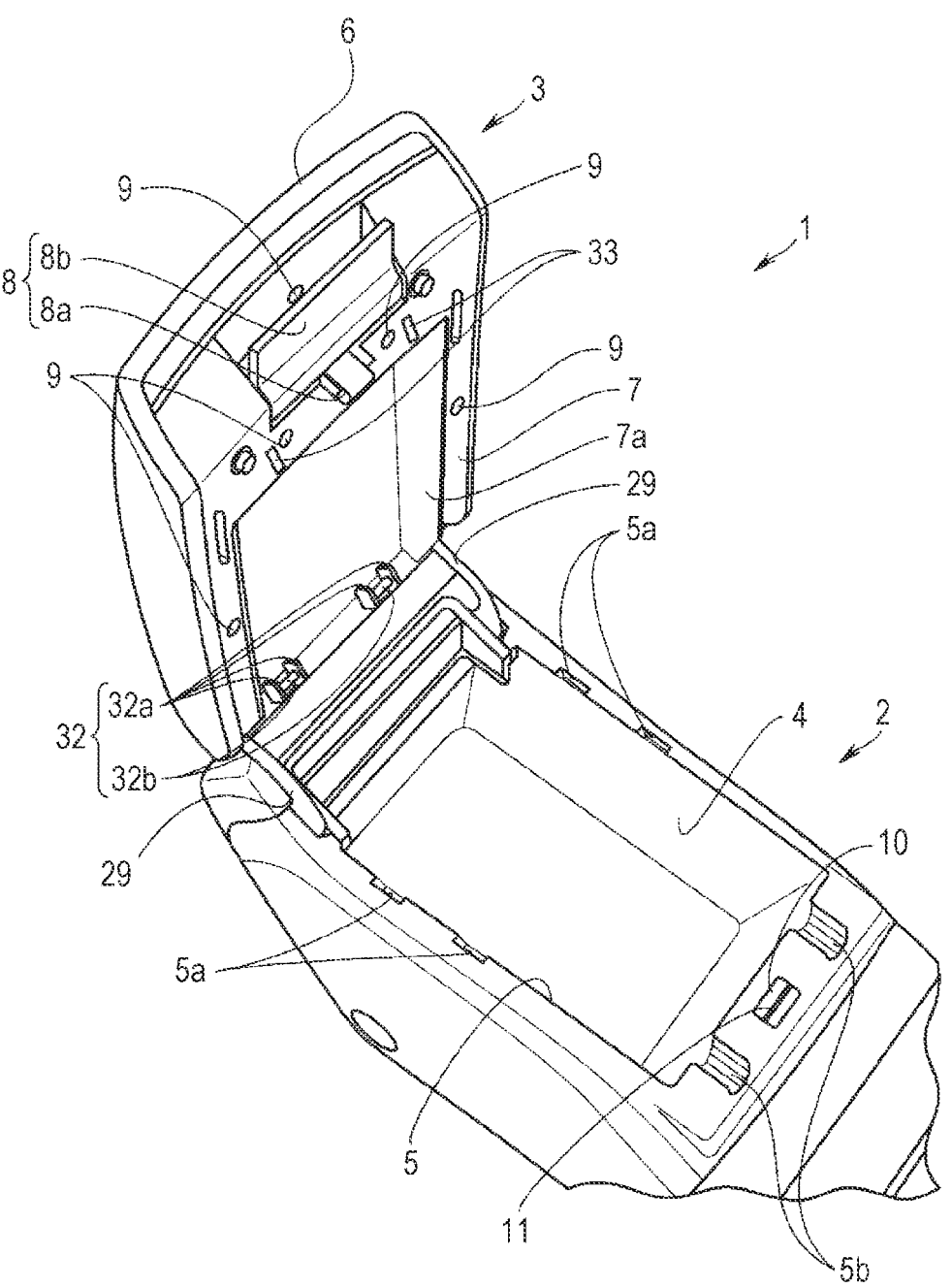
FIG. 1 is a perspective view of a console box.

When the auxiliary storage box as described above is used as a trash box, it is desirable to further improve convenience such that the auxiliary storage box can be effectively used outside the destination vehicle.

It is desirable to provide an auxiliary storage box that can achieve high convenience even when used as a trash box.

Hereinafter, an embodiment of the present disclosure will be described with reference to the drawings.

Note that, in the drawings used in the following description, scales are different for each component in order to make each component recognizable in the drawings. Therefore, the disclosure is not limited only to the illustrated form with respect to the quantities of components, the shapes of components, the ratios of the sizes of components, the relative positional relationship of components, and the like described in these drawings.

A configuration of a console box will be described as an example of a storage box to which the auxiliary storage box in the present embodiment is applied. The console box of the present embodiment is provided in a center console (not illustrated). Note that the center console is provided between a driver's seat and a passenger's seat in a vehicle interior of the vehicle.

As illustrated in FIG. 1, a console box 1 includes a box body 2 and a lid body 3.

A box inner 4 is provided inside the box body 2. The box inner 4 is constituted by a hollow member having a substantially rectangular parallelepiped shape. An opening 5 that opens an internal space of the box inner 4 upward is provided in an upper portion of the box inner 4. Here, a pair of first positioning recesses 5a is provided at left and right side edges of the opening 5. These first positioning recesses 5a are constituted by, for example, recesses each having a rectangular shape in plan view and are provided at left and right side edges of the box body 2. A pair of second positioning recesses 5b is provided at a front edge of the opening 5. These second positioning recesses 5b are constituted by, for example, U-shaped grooves each extending from the front edge of the box body 2.

The lid body 3 is provided at a position where the opening 5 can be opened and closed in the upper portion of the box body 2.

The lid body 3 includes a lid body outer 6, a lid body inner 7, and a lock part 8.

The lid body outer 6 is constituted by, for example, a resin member having elasticity. Thus, the lid body 3 may also serve as an "arm rest" on which the arm of the occupant can be placed.

The lid body outer 6 is permanently fixed to the lid body inner 7 by a screw 9 or the like.

The lid body inner 7 has a recess 7a having a rectangular shape in plan view. An outer dimension of the recess 7a in plan view is set to be slightly larger than an outer dimension of a bottom surface of a box tissue, for example.

Note that each surface of the box tissue is defined as follows for convenience.

That is, a surface of the box tissue provided with a tissue takeout slot is defined as an upper surface, and a surface facing the upper surface is defined as the bottom surface. Further, a surface in contact with short sides of the upper surface and the bottom surface is defined as left and right side surfaces.

Furthermore, the lid body inner 7 further includes support parts 32 and slits 33.

The support parts 32 are provided in a pair on a wall portion forming the recess 7a at a rear of the lid body inner 7. Each support part 32 has a pair of projecting parts 32a and a shaft 32b supported between the pair of projecting parts 32a. These support parts 32 can swingably support an auxiliary lid body 15 described later.

The slits 33 are provided in pairs on the surface of the lid body inner 7 facing the box body 2 in front of the recess 7a and at positions facing the opening 5. Each of the slits 33 has a hole shape for inserting and fixing a projection. These slits 33 are capable of detachably fixing the auxiliary lid body 15 described later to the lid body inner 7.

Furthermore, the lid body inner 7 is supported by the box body 2 via a hinge (not illustrated) provided at a rear end. Thus, the lid body 3 is swingable with the rear end of the box body 2 as a fulcrum. Due to such swinging, the lid body 3 can be displaced between a closing position where the lid body 3 closes the opening 5 of the box body 2 and an opening position where the lid body 3 opens the opening 5 of the box body 2. Note that the opening position of the lid body 3 with respect to the box body 2 is defined by the arm stopper 29.

The lock part 8 is provided at the front end of the lid body inner 7. The lock part 8 integrally includes a hook 8a and a lever 8b.

The hook 8a is inserted into a hole 10 provided in the box body 2 when the lid body 3 closes the opening 5. Then, the hook 8a inserted into the hole 10 of the box body 2 is locked to a locking part 11. Note that the hook 8a is biased toward the locking part 11 by a biasing force of a spring (not illustrated) or the like provided inside the lock part 8.

The lever 8b is pulled up when the opening 5 is opened by the lid body 3. Thus, the lever 8b has a structure for releasing the locking of the hook 8a with respect to the locking part 11.

An auxiliary storage box 13 for storing articles and the like is stored inside the console box 1 configured as described above (see FIGS. 2 and 3).

Figure 2:
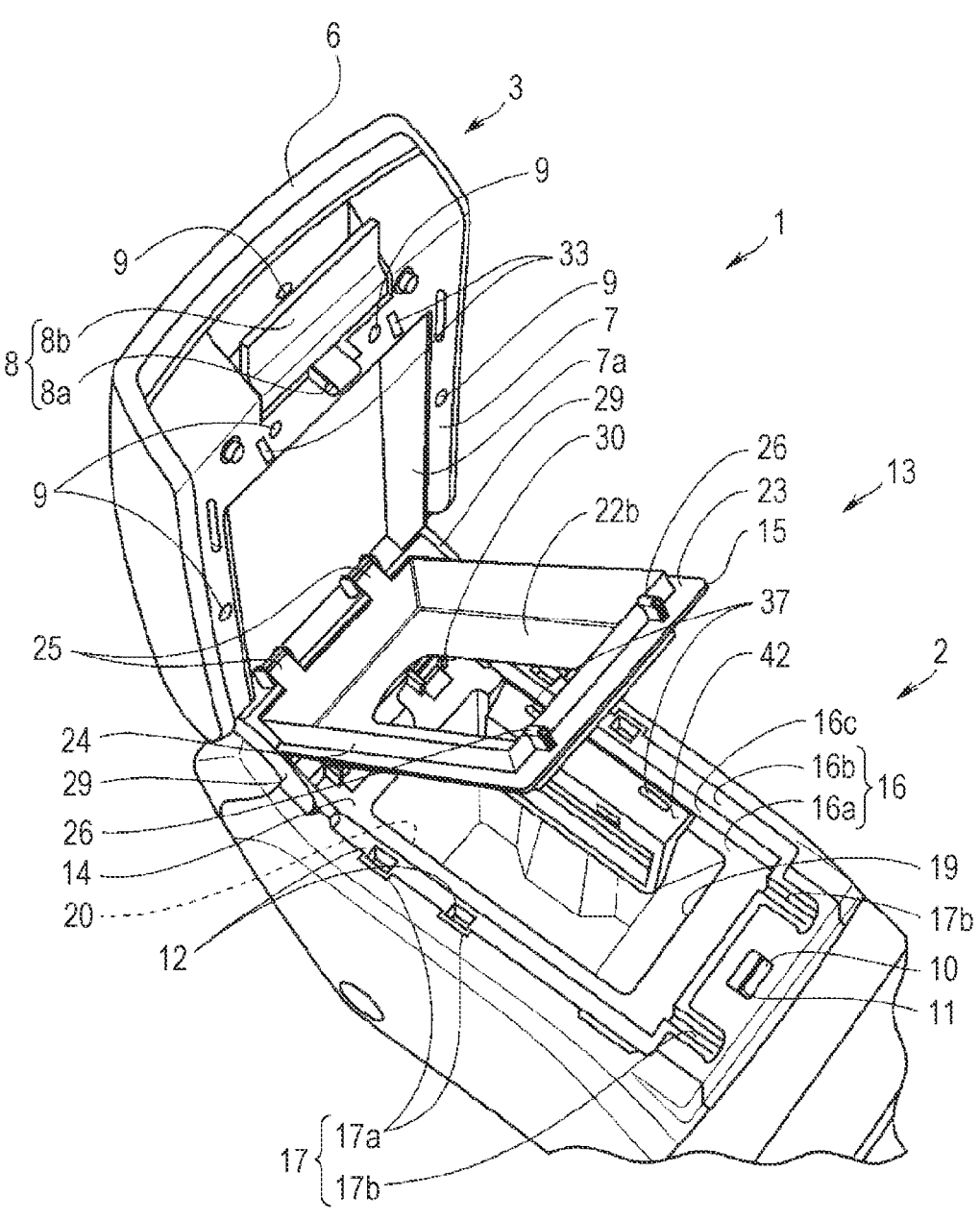
FIG. 2 is a perspective view of the console box in a state where an auxiliary storage box is stored and an auxiliary lid body is opened with respect to a lid body.
Figure 3:
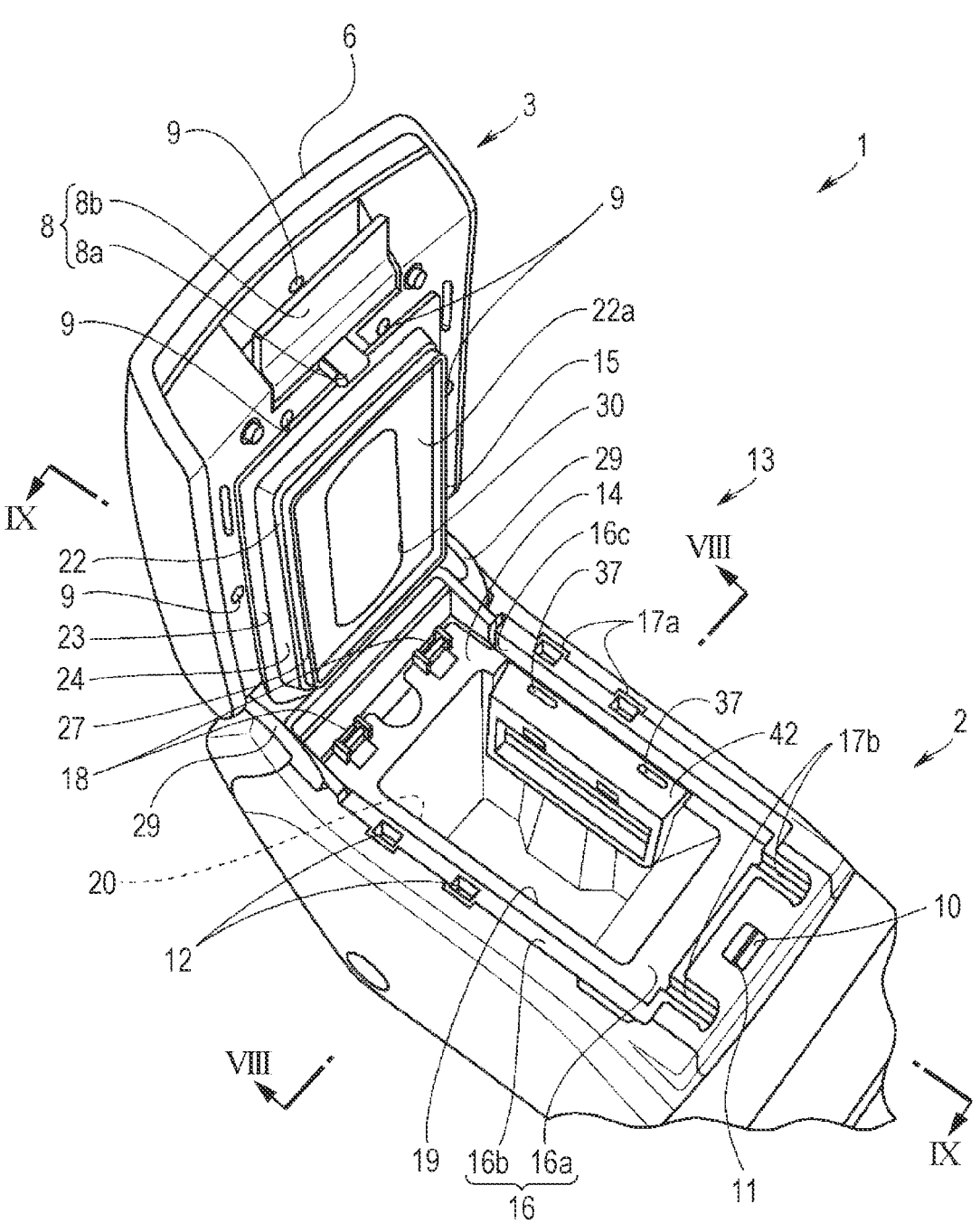
FIG. 3 is a perspective view of the console box in a state where the auxiliary storage box is stored and the auxiliary lid body is closed with respect to the lid body.
Figure 6:
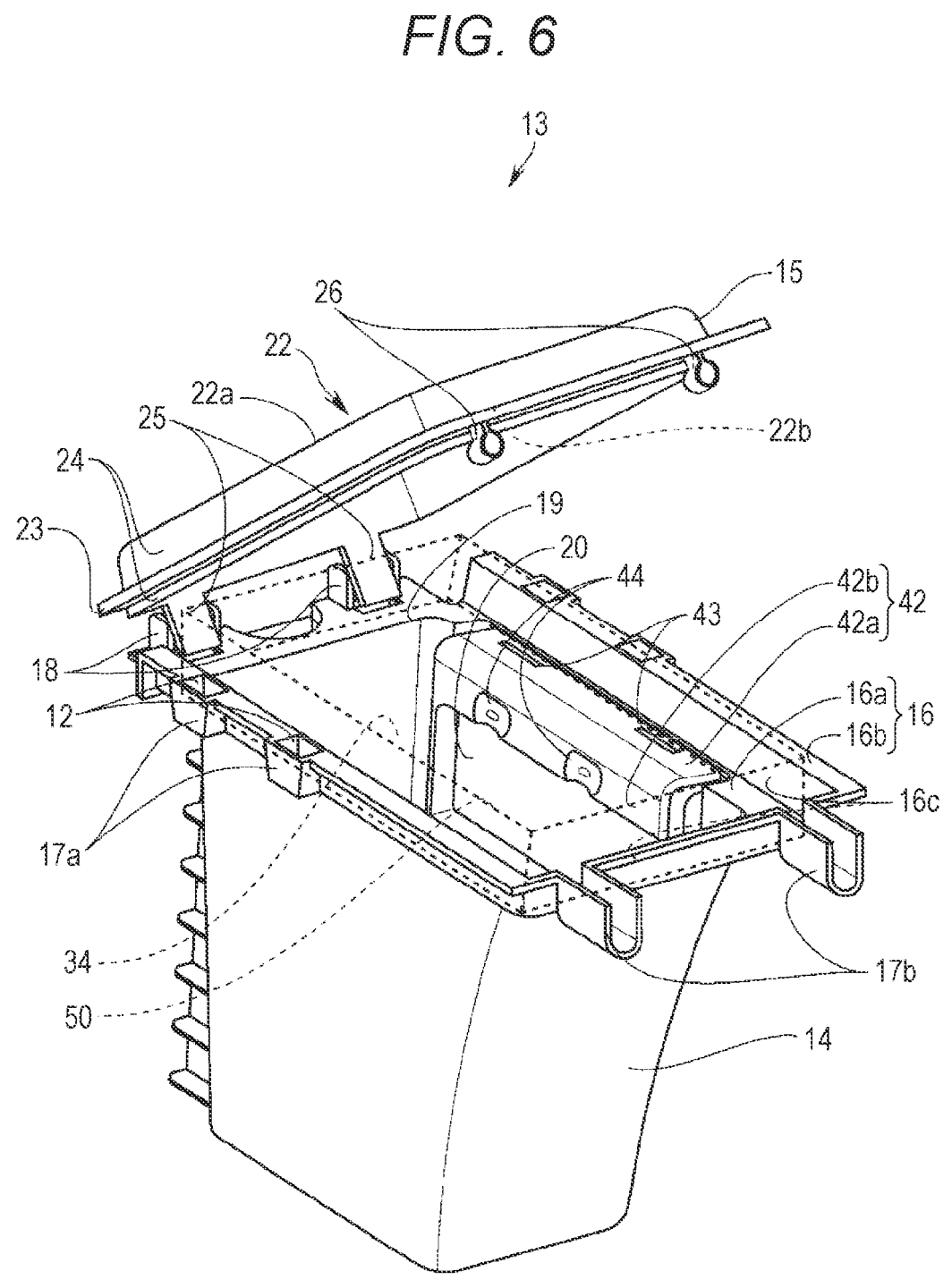

The auxiliary storage box 13 can be detachably held with respect to the console box 1. As illustrated in FIGS. 2, 3, and 6, the auxiliary storage box 13 includes an auxiliary box body 14, the auxiliary lid body 15, and an auxiliary box attachment 42.

The auxiliary box body 14 has a hollow and vertically long substantially rectangular parallelepiped shape that can be accommodated in the box body 2 (box inner 4).

An opening 19 that opens an internal space is formed in an upper portion of the auxiliary box body 14. Further, at a lower end of the auxiliary box body 14, a flat surface for allowing the auxiliary box body 14 to stand by itself is formed.

Figure 4:
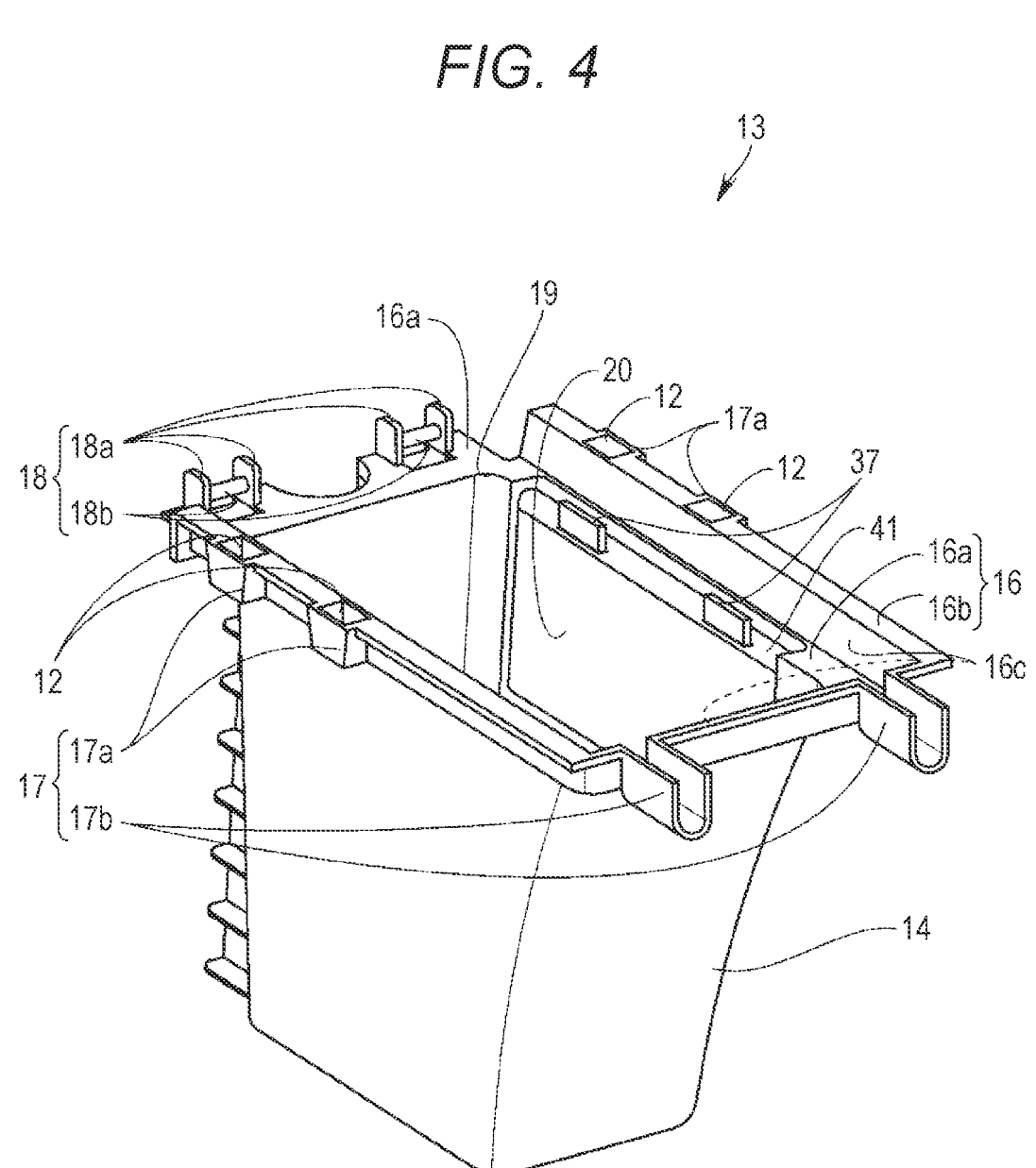
FIG. 4 is a perspective view of an auxiliary box body as viewed from diagonally front right.
Figure 5:
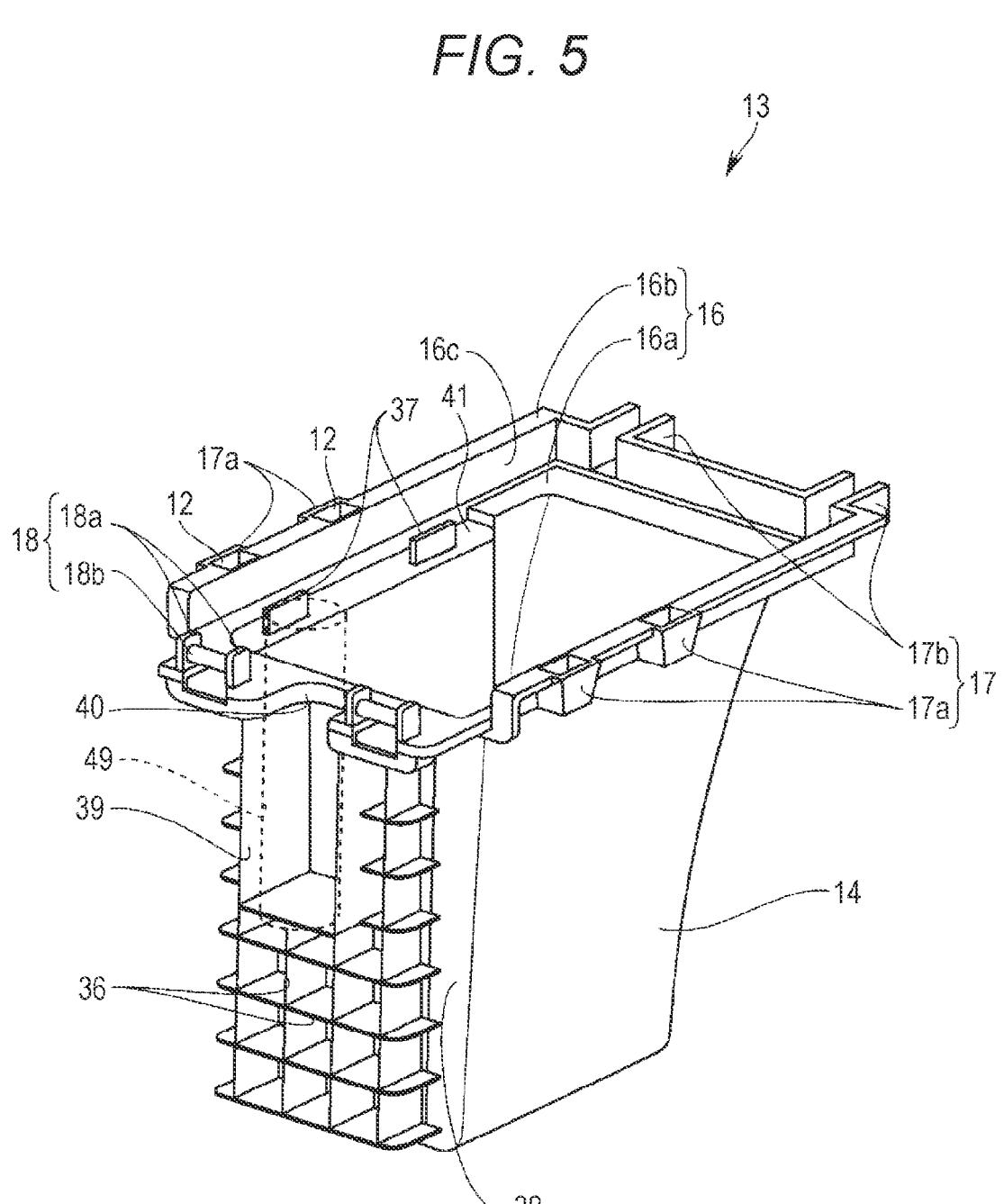
FIG. 5 is a perspective view of the auxiliary box body as viewed from diagonally rear right.

Furthermore, as illustrated in FIGS. 4 and 5, the auxiliary box body 14 further has an outward flange 16, fixing portions 17, support parts 18, a reinforcing part 36, and attachment mounts 37.

The outward flange 16 has a first outward flange 16a and a second outward flange 16b. The first outward flange 16a is provided on an outer periphery of the opening 19 formed in the upper portion of the auxiliary box body 14. The first outward flange 16a is formed outward with respect to a side wall 20 of the auxiliary box body 14.

The second outward flange 16b is coupled to the first outward flange 16a in a stepwise manner via a wall portion 16c. That is, the wall portion 16c extending upward is formed at a front edge and left and right side edges of the first outward flange 16a. At an upper end of the wall portion 16c, the second outward flange 16b is formed outward with respect to the wall portion 16c.

Note that surfaces (upper surfaces) of the first outward flange 16a and the second outward flange 16b constituting the outward flange 16 have a planar shape. Thus, the outward flange 16 may serve as a "lid receiving portion" that abuts on the auxiliary lid body 15 described later.

The fixing portion 17 has first fixing portions 17a and second fixing portions 17b.

The first fixing portions 17a are constituted by a pair of projections on the left and right sides of the auxiliary box body 14. These first fixing portions 17a are integrally formed with the outward flange 16 at positions corresponding to the respective first positioning recesses 5a.

A pair of holes 12 is formed on an upper surface of each of the first fixing portions 17a. The auxiliary box attachment 42 described later can be detachably attached to the holes 12. Note that the holes 12 each have a shape that becomes narrower from the upper surface to the bottom surface.

The second fixing portions 17b are constituted by a pair of projections provided at the front end of the opening 19. These second fixing portions 17b are constituted by, for example, U-shaped grooves each extending from the front end of the opening 19 at positions corresponding to the second positioning recesses 5b, respectively.

When the auxiliary box body 14 is stored in the box body 2, the fixing portions 17 configured as described above are fitted to the respective first and second positioning recesses 5a and 5b of the box body 2. That is, each of the first fixing portions 17a is fitted into the corresponding first positioning recess 5a. Further, each of the second fixing portions 17b is fitted into the corresponding second positioning recess 5b. Due to such fitting, the auxiliary box body 14 is positioned in a predetermined manner with respect to the box body 2. Note that, as described above, in the first fixing portions 17a, the holes 12 for detachably attaching the auxiliary box attachment 42 described later are formed. Therefore, each of the first fixing portions 17a can also be used as a fixing portion for holding the auxiliary box attachment 42.

As illustrated in FIG. 4, the support parts 18 are provided in a pair on the first outward flange 16a at the rear of the auxiliary box body 14. A distance between the pair of support parts 18 is set to be equal to a distance between the pair of support parts 32 provided on the lid body inner 7.

Each support part 18 has a pair of projecting parts 18a provided on a first outward flange 16a and a shaft 18b supported between the pair of projecting parts 18a. These support parts 18 can swingably support the auxiliary lid body 15 described later.

As illustrated in FIG. 5, the reinforcing part 36 is constituted by, for example, flat ribs coupled in a lattice shape. Each rib coupled in a lattice shape protrudes substantially perpendicularly to a back surface 38 of the auxiliary box body 14. Thus, the auxiliary box body 14 can obtain sufficient rigidity.

Furthermore, the reinforcing part 36 has a substantially rectangular parallelepiped cavity 39. The cavity 39 is disposed between the pair of support parts 18 on the back surface 38 side of the auxiliary box body 14.

An upper end of the cavity 39 is disposed at a position coinciding with the first outward flange 16a. In order to open an upper portion of the cavity 39, the first outward flange 16a is provided with a locking hole 40 in an arc shape.

In the present embodiment, a central angle defining an arc length of the locking hole 40 is set to be larger than 180°, for example. Thus, the locking hole 40 can support a cylindrical member.

In this way, for example, a warning flare 49 or the like can be mounted to the cavity 39 in which the locking hole 40 is formed at the upper end. For example, the warning flare 49 is inserted into the cavity 39 from above the locking hole 40. Thus, the warning flare 49 is locked to the locking hole 40, and the cavity 39 can support the warning flare 49.

The attachment mounts 37 are constituted by a pair of projections having a substantially rectangular parallelepiped shape. The attachment mounts 37 are formed in a recess 41 provided in the first outward flange 16a. That is, the pair of projections constituting the attachment mounts 37 is formed to protrude upward from a bottom surface of the recess 41. Further, a height of the pair of projections constituting the attachment mounts 37 is set to be substantially the same as a depth of the recess 41. Thus, projecting ends of the attachment mounts 37 are set at substantially the same height as the surface (upper surface) of the first outward flange 16a.

The attachment mounts 37 configured as described above can hold the auxiliary box attachment 42 described later in a state of being stored in the auxiliary box body 14.

The auxiliary lid body 15 can be detachably attached to the lid body 3 (see FIGS. 2 and 3). The auxiliary lid body 15 attached to the lid body 3 swings integrally with the lid body 3 to open and close the opening 19 of the auxiliary box body 14.

Figure 7:
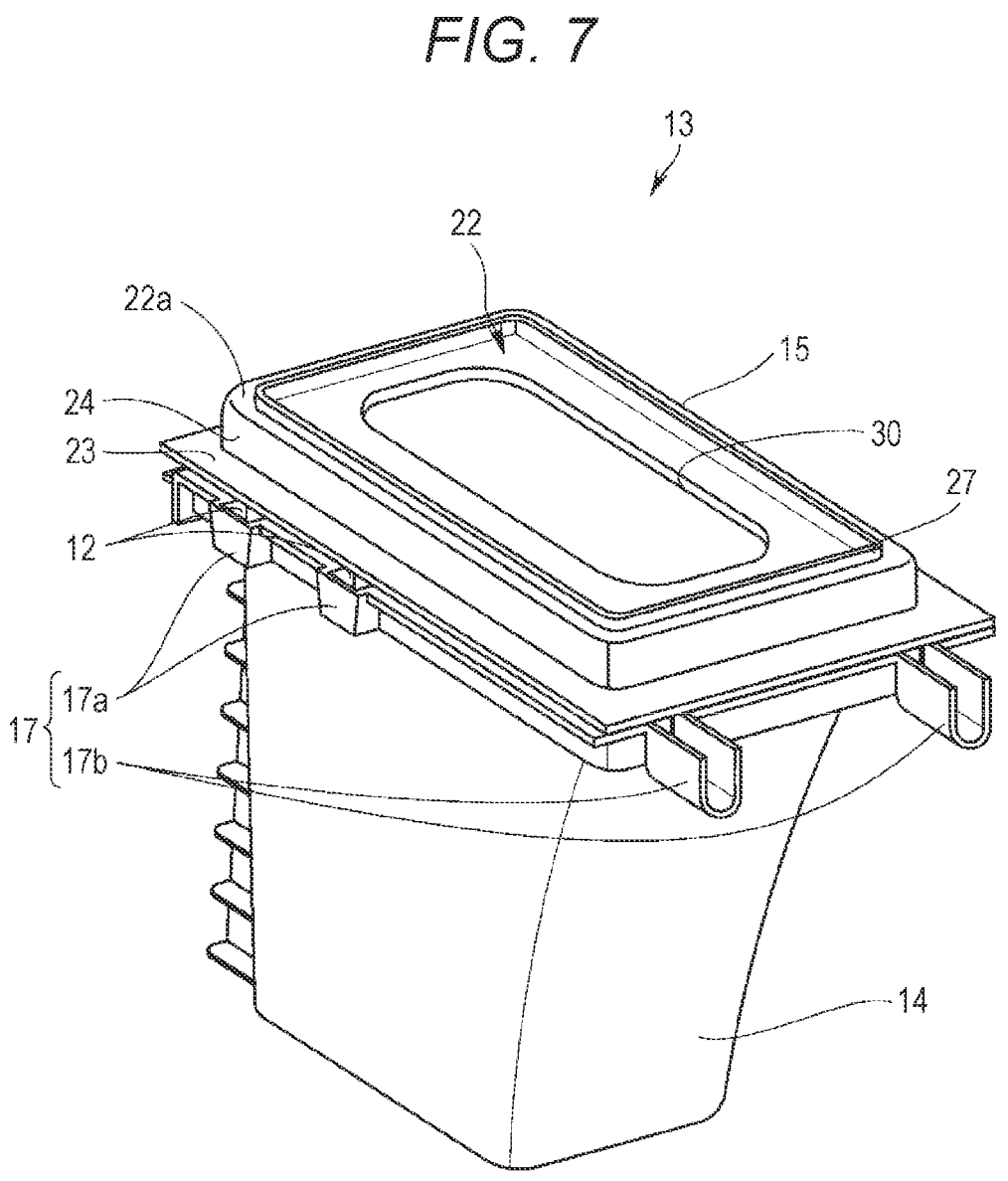
FIG. 7 is a perspective view of the auxiliary storage box in a state where the auxiliary lid body is closed with respect to the auxiliary box body in a state where the auxiliary lid body is attached to the auxiliary box body.

Further, the auxiliary lid body 15 can also be detachably attached to the auxiliary box body 14 (see FIGS. 6 and 7). The auxiliary lid body 15 can open and close the opening 19 of the auxiliary box body 14 by swinging with respect to the auxiliary box body 14.

The auxiliary lid body 15 includes a flat plate portion 22, a side wall portion 24, and an outward flange 23.

The flat plate portion 22 has, for example, a substantially rectangular shape in plan view capable of abutting on the first outward flange 16a of the auxiliary box body 14 to close the opening 19. An outer dimension of the flat plate portion 22 in plan view is substantially equal to or larger than an outer dimension of the opening 19. Further, the outer dimension of the flat plate portion 22 in plan view is smaller than an outer dimension of the first outward flange 16a. Furthermore, the outer dimension of the flat plate portion 22 in plan view is substantially equal to an outer dimension of the upper surface or the bottom surface of the box tissue.

Further, the flat plate portion 22 has a hole 30. The hole 30 is formed in a substantially central portion of the flat plate portion 22 to have a rounded rectangular shape. The hole 30 is provided, for example, as an outlet for tissue or the like.

Furthermore, a seal member 27 is provided on a first surface 22a which is one surface of the flat plate portion 22.

The seal member 27 is annularly provided along an outer periphery of the first surface 22a. The seal member 27 is formed by, for example, an elastic member such as a rubber material. The seal member 27 is bonded to the first surface 22a by an adhesive part such as a double-sided tape.

Figure 8:
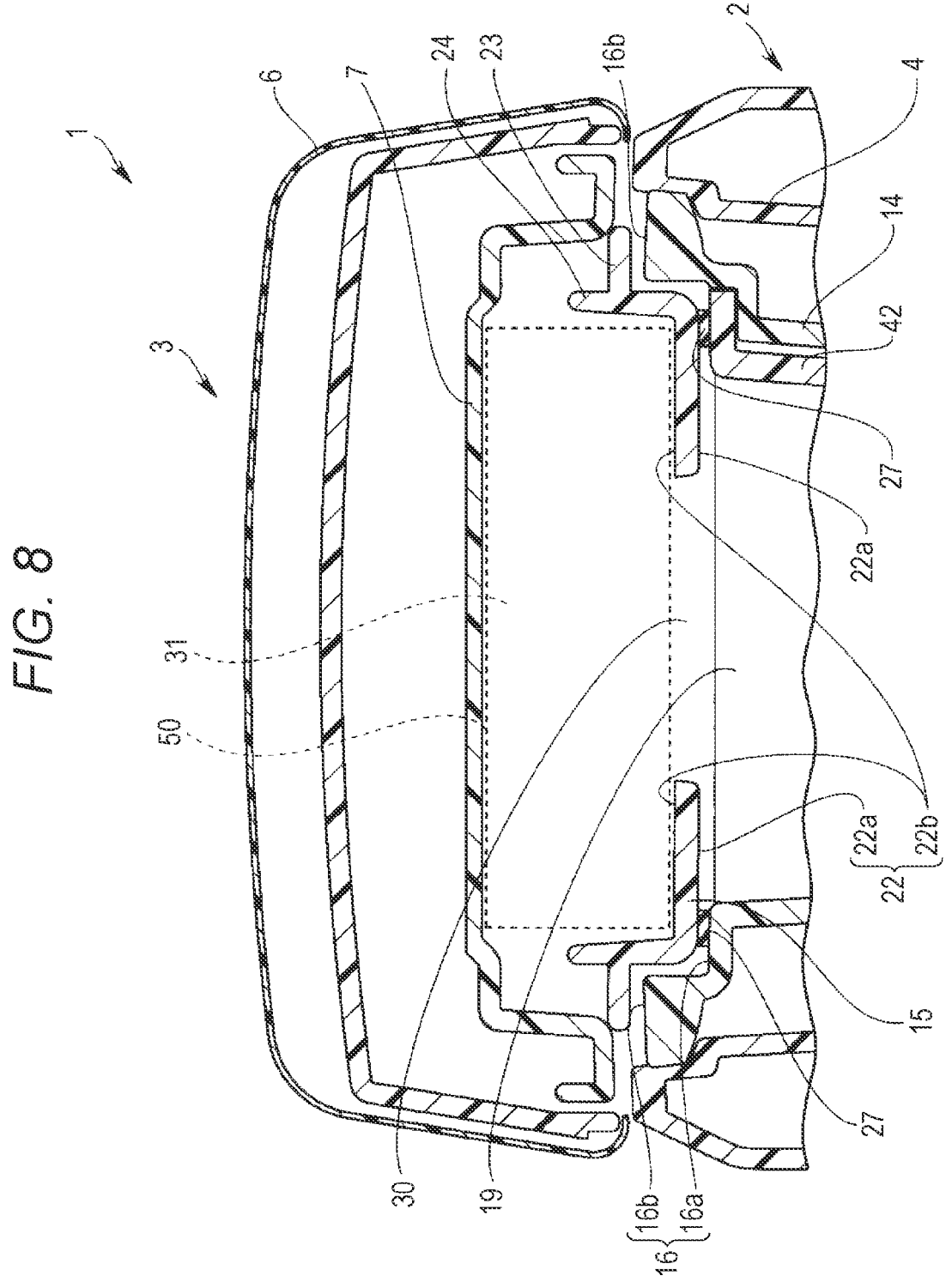
FIG. 8 is a cross-sectional view taken along line VIII-VIII in a state where the lid body of FIG. 3 is closed.
Figure 9:
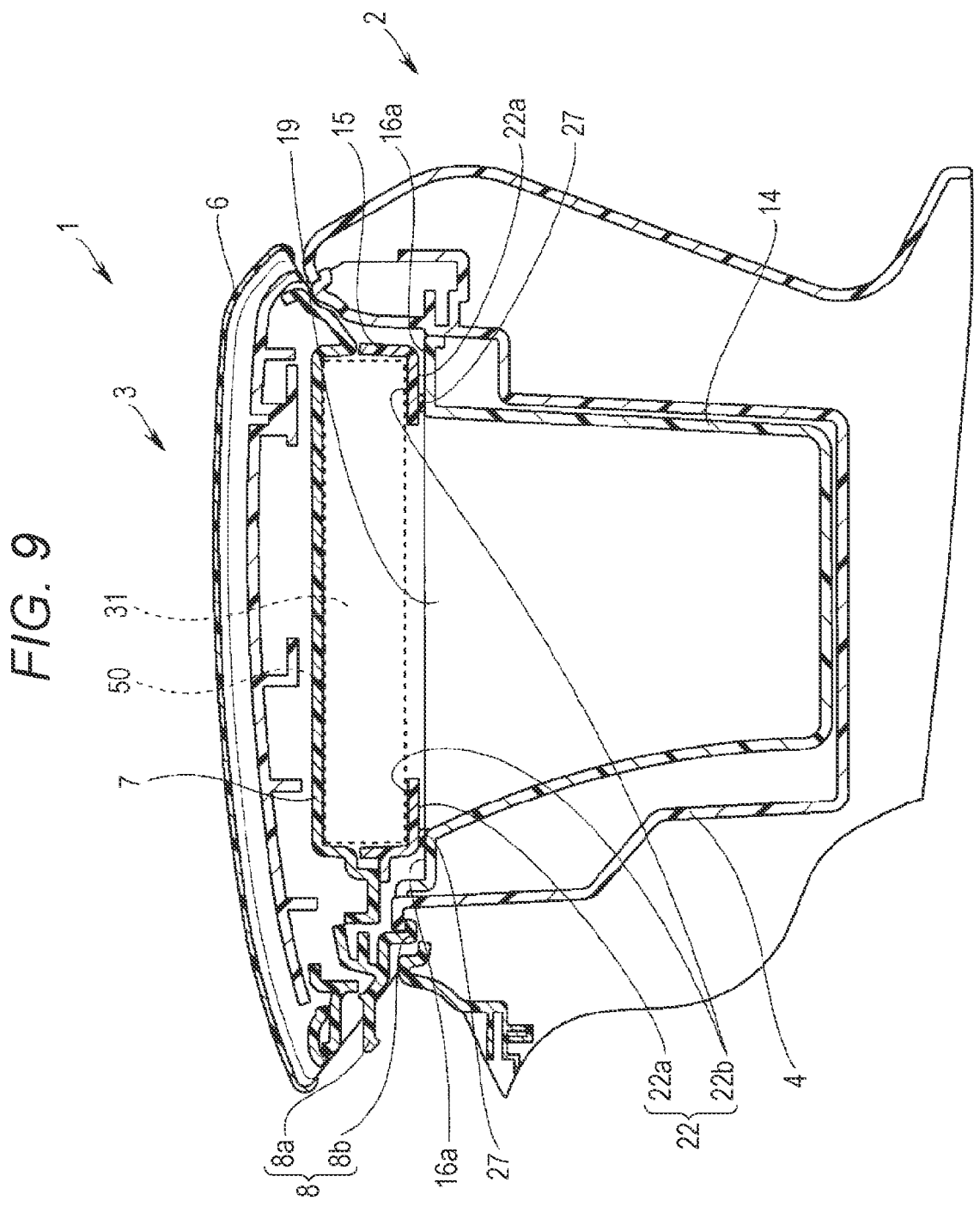
FIG. 9 is a cross-sectional view taken along line IX-IX in a state where the lid body of FIG. 3 is closed.

As illustrated in FIGS. 8 and 9, when the flat plate portion 22 closes the opening 19, the seal member 27 bonded to the first surface 22a in this manner can elastically abut on the surface of the first outward flange 16a and a surface of the auxiliary box attachment 42 stored inside the auxiliary box body 14 described later. Due to the abutment of the seal member 27, the flat plate portion 22 can seal the outer peripheral side of the opening 19.

The side wall portion 24 protrudes annularly from an edge of a second surface 22b which is a surface opposite to the first surface 22a in the flat plate portion 22.

A pair of attachment portions 25 protrudes from a rear of the side wall portion 24. A distance between the pair of attachment portions 25 is set to be equal to the distance between the pair of support parts 32 provided on the lid body inner 7 and the distance between the pair of support parts 18 provided on the auxiliary box body 14. An arc-shaped locking groove (not illustrated) is formed at the protruding end of each attachment portion 25.

The pair of attachment portions 25 configured as described above can be selectively attached to the pair of support parts 32 or the pair of support parts 18. That is, as illustrated in FIGS. 2 and 3, in a state where the second surface 22b side of the flat plate portion 22 faces the lid body 3 (lid body inner 7), the pair of attachment portions 25 can be attached to the pair of support parts 32.

Alternatively, as illustrated in FIGS. 6 and 7, in a state where the second surface 22b side of the flat plate portion 22 faces the auxiliary box body 14, the pair of attachment portions 25 can be attached to the pair of support parts 18.

Such attachment is achieved by locking the locking groove to the shaft 32b or the shaft 18b. This locking is performed by pushing the shaft 32b or the shaft 18b into the locking groove while elastically deforming the locking groove. Therefore, the opening of the locking groove is set to be smaller than diameters of the shaft 32b and the shaft 18b.

The outward flange 23 extends outward from a middle position in a height direction of the side wall portion 24. The planar view shape of the outward flange 23 substantially coincides with a planar view shape of the second outward flange 16b of the auxiliary box body 14. The outward flange 23 can abut on a surface of the lid body inner 7 around the recess 7a and the second outward flange 16b.

The outward flange 23 has a pair of fixing portions 26 at a front portion. Each fixing portion 26 protrudes from a second surface (that is, a surface on the same side as the second surface 22b of the flat plate portion 22) of the outward flange 23. A distance between the pair of fixing portions 26 is set to be equal to a distance between the pair of slits 33 provided in the lid body inner 7 and a distance between the pair of second fixing portions 17b provided in the auxiliary box body 14. Each fixing portion 26 has a projection having a substantially round shape at a distal end. The projection of each fixing portion 26 can be inserted into each of the slits 33 by pushing. The inserted fixing portion 26 is held by the slit 33. Alternatively, in a state where the second surface 22b side faces the auxiliary box body 14, the projection of each fixing portion 26 can be accommodated at a position not in contact with the pair of second fixing portions 17b having a U-shaped groove shape.

Figure 10:
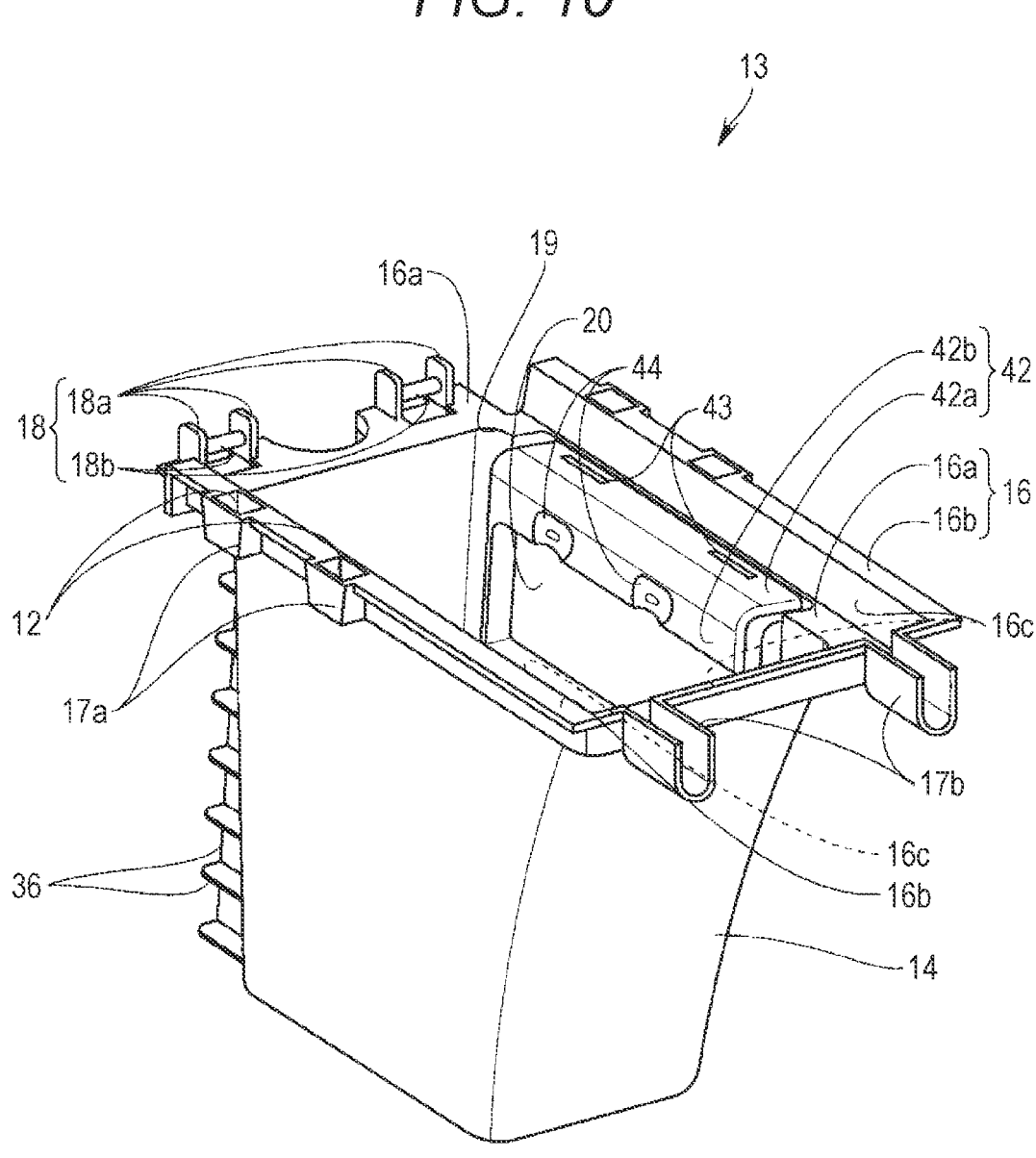
FIG. 10 is a perspective view of the auxiliary box body in a state where an auxiliary box attachment is attached to an inside of the auxiliary box body as viewed from diagonally front right.
Figure 12:
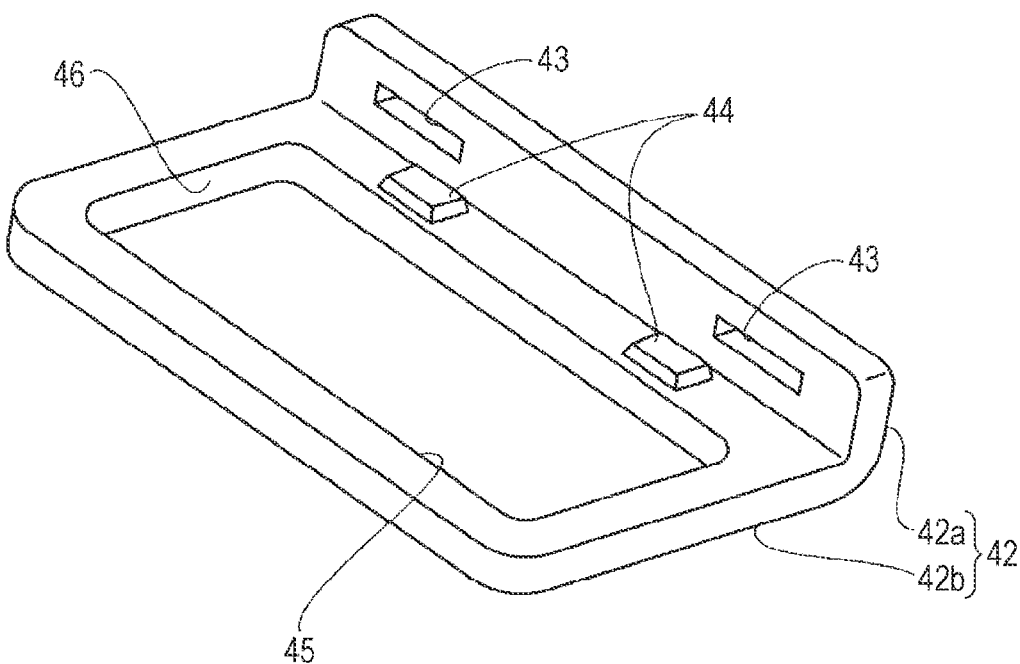
FIG. 12 is a perspective view of the auxiliary box attachment as viewed from a back surface.

As illustrated in FIGS. 10, 11, and 12, the auxiliary box attachment 42 includes a flat plate portion 42a and a frame portion 42b.

The flat plate portion 42a has, for example, a substantially rectangular shape in plan view that can be fitted into the recess 41 provided in the first outward flange 16a. That is, an outer dimension of the flat plate portion 42a is set to be slightly smaller than a dimension of an opening of the recess 41. Further, a thickness dimension of the flat plate portion 42a is set to be substantially the same as the depth of the recess 41.

The flat plate portion 42a has a pair of holes 43 penetrating in a thickness direction of the flat plate portion 42a. Each of the holes 43 is constituted by a hole having a substantially rectangular parallelepiped shape into which each projection constituting the attachment mounts 37 can be inserted. These holes 43 are disposed linearly along a longitudinal direction of the flat plate portion 42a. Further, a distance between the holes 43 is set to be equal to a distance between the pair of projections of the attachment mounts 37. Note that a dimension of an opening surface of each hole 43 is desirably set slightly larger than an outer dimension of the projection of the attachment mount 37 corresponding to each hole 43.

The flat plate portion 42a configured as described above can be held in the recess 41 of the auxiliary box body 14 by inserting each projection of the attachment mounts 37 into each hole 43. Note that a surface (upper surface) of the flat plate portion 42a held in the recess 41 is a plane having substantially the same height as the surface (upper surface) of the first outward flange 16a and the protrusion ends of the attachment mounts 37.

The frame portion 42b is constituted by an annular frame body having a rectangular shape in plan view. The frame portion 42b is coupled to the flat plate portion 42a on one side in a lateral direction of the flat plate portion 42a so as to be substantially orthogonal thereto. With such coupling between the flat plate portion 42a and the frame portion 42b, the auxiliary box attachment 42 has a substantially L shape in a side view.

The frame portion 42b has a pair of protrusions 44 and a hole 45.

Each of the protrusions 44 is provided at an edge close to the flat plate portion 42a among edges constituting the frame portion 42b. These protrusions 44 protrude from a back surface side of the frame portion 42b (the surface on the inner side in the bending direction of the auxiliary box attachment 42) (see FIG. 12).

A distance between the protrusions 44 is set to be equal to a distance between the pair of holes 12 on the left and right sides of the auxiliary box body 14. Further, each of the protrusions 44 has a shape that becomes thinner toward the protrusion end. Note that an outer dimension of each protrusion 44 is desirably set slightly smaller than the inner dimension of the hole 12.

Each of the protrusions 44 configured as described above can be fitted into the hole 12 as a fixing portion constituting each pair formed on the second outward flange 16b of the auxiliary box body 14 by insertion from above. The frame portion 42b can be fixed to the auxiliary box body 14 by the fitting.

For example, the hole 45 can support a substantially rectangular parallelepiped article such as a box storing tissues (hereinafter referred to as a box tissue 50) as an auxiliary item.

Therefore, the hole 45 as a support part is formed in a rectangular shape in plan view. For example, a dimension of the hole 45 of the present embodiment in plan view is substantially equal to an outer dimension of a side surface of the box tissue 50 (a surface in contact with short sides of an upper surface and a bottom surface of the box tissue 50).

The hole 45 is formed by a wall portion 46. A height dimension of the wall portion 46 (a thickness dimension of the frame portion 42b) is set to be smaller than a height dimension from a surface of the frame portion 42b to the protrusion end of the protrusion 44. Note that, in a state where the auxiliary box attachment 42 is attached to the outside of the auxiliary box body 14, the wall portion 46 is desirably formed to be inclined so that the dimension of the opening surface becomes slightly smaller from an opening upper surface of the hole 45 toward a lower side.

As illustrated in FIG. 11, in the hole 45 configured as described above, the box tissue 50 can be inserted into the hole 45 in a state where one side surface of the box tissue 50 faces the upper side of the opening upper surface of the hole 45. The box tissue 50 inserted into the hole 45 is supported by the wall portion 46 in a state where one side surface of the box tissue 50 abuts on the installation surface such as an outdoor ground surface.

Note that the auxiliary box attachment 42 configured as described above can be selectively attached to the pair of holes 12 provided on each of the left and right of the auxiliary box body 14.

Next, operations of the auxiliary storage box 13 configured as described above will be described.

First, an operation when the auxiliary storage box 13 (the auxiliary box body 14 and the auxiliary lid body 15) is used in a state of being stored inside the console box 1 will be described. Here, when the auxiliary storage box 13 is stored inside the console box 1 and used, the auxiliary box attachment 42 is not used for supporting the box tissue 50 and the like. In such a case, the auxiliary box attachment 42 is stored inside the auxiliary box body 14.

For example, as illustrated in FIG. 10, the auxiliary box attachment 42 can be stored in a state of abutting on the recess 41 of the auxiliary box body 14 and the side wall 20 by inserting each projection of the attachment mount 37 into each hole 43 provided in the flat plate portion 42a.

When the auxiliary box body 14 is stored in the box inner 4, the fixing portions 17a and 17b of the auxiliary box body 14 are fitted into the positioning recesses 5a and 5b of the box inner 4.

These fitting positions uniquely determine the accommodation position of the auxiliary box body 14 with respect to the box inner 4. Therefore, the auxiliary box body 14 can be accurately positioned with respect to the box body 2, and can be easily stored.

On the other hand, the auxiliary lid body 15 can be detachably attached to the support parts 32 of the lid body inner 7 via the attachment portion 25. Further, the auxiliary lid body 15 can swing about the shafts 32b of the support parts 32 in a state of being attached to the lid body inner 7. Furthermore, the fixing portion 26 of the auxiliary lid body 15 can be detachably fixed to the slits 33.

The auxiliary lid body 15 fixed to the lid body 3 as described above can swing integrally with the lid body 3.

Furthermore, the auxiliary lid body 15 fixed to the lid body 3 forms a first tissue storage portion 31 in an internal space with the recess 7a of the lid body inner 7 as illustrated in FIGS. 8 and 9.

For example, the box tissue 50 can be stored in the first tissue storage portion 31.

For example, in a state where the auxiliary lid body 15 is opened with respect to the lid body 3, the box tissue 50 can be stored in the first tissue storage portion 31.

For example, the box tissue 50 can be attached to an upper side of the second surface 22b in a state where an opening surface of the tissue takeout slot of the box tissue 50 faces the hole 30. By housing the box tissue 50 in this manner, when the lid body 3 opens the opening 19, the tissue can be easily taken out from the first surface 22a side of the hole 30.

In addition, the auxiliary lid body 15 can be easily opened and closed with respect to the lid body 3 around the shaft 32b. Therefore, the box tissue 50 stored in the first tissue storage portion 31 can be easily replaced.

Furthermore, by swinging the auxiliary lid body 15 integrally with the lid body 3, a user or the like can easily access the hole 30 and the opening 19 by one opening/closing operation of the lid body 3.

Thus, for example, when the auxiliary box body 14 is used as a trash box, it is possible to access the tissue takeout slot and the trash box by one opening/closing operation.

The box tissue 50 and the trash box stored in this manner are disposed at positions close to each other. Thus, a used tissue can be easily stored in the trash box.

With the auxiliary box body 14 and the auxiliary lid body 15 configured as described above, the auxiliary storage box 13 can improve convenience.

Further, the seal member 27 provided on the first surface 22a of the auxiliary lid body 15 elastically abuts on the surface of the first outward flange 16a and the surface of the flat plate portion 42a of the auxiliary box attachment 42 when the auxiliary lid body 15 closes the opening 19 integrally with the lid body 3. Due to the abutment of the seal member 27, the auxiliary lid body 15 can seal the outer peripheral side of the opening 19.

Therefore, for example, when the auxiliary box body 14 is used as a trash box, it is possible to prevent trash from being scattered from the auxiliary storage box 13, and to achieve high functionality in the vehicle interior from the viewpoint of hygiene.

Next, with reference to FIGS. 4, 5, 6, 7, 10, 11, and 12, an operation when the auxiliary storage box 13 (the auxiliary box body 14 and the auxiliary lid body 15) is taken out of the console box 1 and used outdoors or the like will be described.

The lower end of the auxiliary box body 14 has a flat surface. Therefore, for example, even when used outdoors, the auxiliary box body 14 can stand by itself.

When used outdoors, the auxiliary lid body 15 can be attached to the auxiliary box body 14 in a state of being detached from the lid body inner 7. For example, the auxiliary lid body 15 can be attached in a state where the second surface 22b faces the opening 19 of the auxiliary box body 14.

The auxiliary lid body 15 attached in this manner is swingably held with respect to the shafts 18b of the auxiliary box body 14 via the attachment portion 25. The outward flange 23 of the auxiliary lid body 15 abuts on the upper surface of the second outward flange 16b when the auxiliary lid body 15 closes the opening 19 by swinging. When the auxiliary lid body 15 closes the opening 19 of the auxiliary box body 14 in this manner, the space formed between the second surface 22b of the auxiliary lid body 15 and the opening 19 of the auxiliary box body 14 can be used as the second tissue storage portion 34 (see FIG. 6).

That is, for example, the box tissue 50 can be stored in the second tissue storage portion 34. For example, the box tissue 50 can be stored in the second tissue storage portion 34 in a state where the auxiliary lid body 15 opens the opening 19. The box tissue 50 is preferably disposed in a state where the surface of the tissue takeout slot of the box tissue 50 faces the hole 30.

The box tissue 50 stored in this manner can be held in the opening 19 of the auxiliary box body 14 by the edge of the bottom surface of the box tissue 50 abutting on the first outward flange 16a. In the box tissue 50 stored in this manner, the tissue can be easily taken out from the first surface 22a with respect to the hole 30.

Further, when the auxiliary box body 14 is used as a trash box, the box tissue 50 can be stored in the upper part of the auxiliary box body 14. In the auxiliary storage box 13 configured as described above, since the box tissue 50 can be carried in an integrally stored state even outdoors, convenience can be further improved.

Further, in the auxiliary storage box 13, in a state where the auxiliary lid body 15 is detached from the auxiliary box body 14, the warning flare 49 can be mounted in the cavity 39 formed on the back surface 38 side of the auxiliary box body 14.

As illustrated in FIG. 5, in the cavity 39, for example, the warning flare 49 is inserted into the cavity 39 from above the locking hole 40. Thus, the warning flare 49 is locked to the locking hole 40, and the warning flare 49 can be mounted in the cavity 39.

That is, the auxiliary box body 14 can also be used as a warning flare holder that can be installed in a state where the warning flare 49 is upright in an emergency when the warning flare 49 is used.

Therefore, for example, even in a case where a warning flare is placed under a severe environment such as a sloping road, a rainfall, or a place with a strong wind, the user of the warning flare can reliably notify the driver of the surrounding vehicle of an emergency or the like. As described above, the auxiliary storage box 13 that can also be used as the warning flare holder can further improve convenience when used outdoors.

Further, in the auxiliary storage box 13, for example, the box tissue 50 can be attached to the outside of the auxiliary box body 14 in a state where the auxiliary lid body 15 is detached from the auxiliary box body 14.

For example, this can be achieved by attaching the auxiliary box attachment 42 that supports the box tissue 50 and the like to the outside of the auxiliary box body 14.

For example, as illustrated in FIG. 11, in the auxiliary box attachment 42, the pair of protrusions 44 formed on the frame portion 42b can be fitted into the holes 12 as a pair of fixing portions formed in the second outward flange 16b of the auxiliary box body 14 by insertion from above. The fitting allows the auxiliary box attachment 42 to be attached to the auxiliary box body 14.

The auxiliary box attachment 42 attached in this manner has the hole 45 for inserting a substantially rectangular parallelepiped article such as the box tissue 50 into the frame portion 42b. The hole 45 is formed by the wall portion 46.

The box tissue 50 inserted into the hole 45 is supported by the wall portion 46 in a state where one side surface of the box tissue 50 abuts on the installation surface such as an outdoor ground surface. That is, in the auxiliary storage box 13, the box tissue 50 can be mounted by attaching the auxiliary box attachment 42 to the outside of the auxiliary box body 14.

Thus, the box tissue 50 and the auxiliary box body 14 can be disposed at positions close to each other. Therefore, since used tissues can be easily stored in the auxiliary box body 14 as a trash box, high convenience when used outdoors can be achieved.

Further, as described above, the auxiliary box attachment 42 can be stored inside the auxiliary box body 14 when not used outside the auxiliary box body 14. Therefore, a loss when the auxiliary box attachment 42 is not used can be prevented in advance.

Note that, in the present embodiment, an example has been described in which the box tissue is supported with respect to the hole 45 of the auxiliary box attachment 42 and used outside the auxiliary box body 14, but for example, the frame portion 42b of the auxiliary box attachment 42 may be used as a mounting frame for mounting a deformable bag such as a plastic bag inside the hole 45 (an opening of a bag is folded back outward and hooked to the flat plate portion 42a and the frame portion 42b). Accordingly, sorting can be performed according to the type of waste, and thus high convenience can be achieved.

Further, in the present embodiment, an example of application to the console box has been described, but it may be applied to other storage units such as a glove box.

According to such an embodiment, the auxiliary storage box 13 is an auxiliary storage box 13 that is detachable and storable in the console box 1 provided in the vehicle interior, and includes the auxiliary box body 14 that is storable inside the console box 1, and the auxiliary box attachment 42 that is detachably attached to the auxiliary box body 14 and capable of supporting an auxiliary item used in combination with the auxiliary box body 14 outside the auxiliary box body 14. With these configurations, the auxiliary storage box 13 can achieve high convenience even when used as a trash box.

The disclosure described in the above embodiments is not limited to these embodiments, and various modifications can be made in the implementation stage without departing from the gist of the disclosure. Furthermore, the above-described embodiments include inventions at various stages, and various inventions can be extracted by appropriately combining disclosed constituent elements.

Further, for example, when the problem to be solved in the disclosure can be solved and the effect of the invention can be obtained even if some constituent elements are deleted from all the constituent elements described in the embodiments, the configuration from which the constituent elements are deleted can be extracted as an invention.

The invention claimed is:

1. An auxiliary storage box that is detachable and storable in a storage box provided in a vehicle interior, the auxiliary storage box comprising:
   an auxiliary box body that is storable inside the storage box, the auxiliary box body comprising a hole; and
   an auxiliary box attachment that is detachably attached to the auxiliary box body and capable of supporting an auxiliary item used in combination with the auxiliary box body outside the auxiliary box body, wherein the auxiliary box attachment comprises a protrusion portion, wherein the protrusion portion engages with the hole of the auxiliary box body to hold the auxiliary box attachment outside the auxiliary box body when the auxiliary box attachment is in use.

2. The auxiliary storage box according to claim 1, wherein the auxiliary box body comprises a lid receiving portion in an upper opening, and
   the lid receiving portion comprises a first outward flange and a second outward flange coupled to the first outward flange in a stepwise manner via a wall portion.

3. The auxiliary storage box according to claim 2, wherein the lid receiving portion of the auxiliary box body comprises a first outward flange comprising an attachment portion, and
   the auxiliary box attachment further comprises a hole engaging with the attachment portion to hold the auxiliary box attachment inside the auxiliary box body when the auxiliary box attachment is not in use.

4. The auxiliary storage box according to claim 1, wherein the auxiliary box body comprises:
   a pair of first fixing portions, the first fixing portions each having a projecting shape and being disposed on respectively left and right sides of the auxiliary box body as fixing portions configured to fix the auxiliary box body to the storage box, wherein the hole is formed on each of the pair of first fixing portions; and
   a second fixing portion disposed at a front end of the auxiliary box body, the second fixing portion comprising a pair of projections extending from the front end.

5. The auxiliary storage box according to claim 2, wherein the auxiliary box body further comprises:
   a pair of first fixing portions, the first fixing portions each having a projecting shape and being disposed on respectively left and right sides of the auxiliary box body as fixing portions configured to fix the auxiliary box body to the storage box, wherein the hole is formed on each of the pair of first fixing portions; and
   a second fixing portion disposed at a front end of the auxiliary box body, the second fixing portion comprising a pair of projections extending from the front end.

6. The auxiliary storage box according to claim 4, wherein the first fixing portions each comprise a hole on an upper surface of the respective first fixing portion, and
   each hole is configured to hold the auxiliary box attachment outside the auxiliary box body when the auxiliary box attachment is in use.

7. The auxiliary storage box according to claim 5, wherein the first fixing portions each comprise a hole on an upper surface of the respective first fixing portion, and
   each hole is configured to hold the auxiliary box attachment outside the auxiliary box body when the auxiliary box attachment is in use.

8. The auxiliary storage box according to claim 1, further comprising a support part,
   wherein the auxiliary box attachment comprises a frame portion, and
   wherein the support part is configured to support the auxiliary item when the auxiliary box attachment is used while being attached to an outside of the auxiliary box body.

9. The auxiliary storage box according to claim 1, wherein the auxiliary box body comprises a reinforcing part on a back surface,
   the auxiliary box body has a cavity configured to mount a warning flare at the reinforcing part,
   the auxiliary box body further comprises a locking hole at an upper end of the cavity, and
   the locking hole is configured to support the warning flare.

10. The auxiliary storage box according to claim 1, wherein the protrusion portion is disposed on a frame portion of the auxiliary box attachment.

11. The auxiliary storage box according to claim 3, wherein the hole is disposed on a flat plate portion of the auxiliary box attachment.

12. The auxiliary storage box according to claim 10, wherein the frame portion comprises a hole configured to support the auxiliary item when the auxiliary box attachment is attached outside the auxiliary box body.

\* \* \* \* \*